United States Patent
Meredith et al.

(10) Patent No.: US 7,915,854 B2
(45) Date of Patent: Mar. 29, 2011

(54) MAXIMIZING ENERGY STORAGE LIFE IN A FUEL CELL SYSTEM USING ACTIVE TEMPERATURE COMPENSATION

(75) Inventors: Jon W. Meredith, Kinderhook, NY (US); Dustan L. Skidmore, Latham, NY (US)

(73) Assignee: Plug Power Inc., Latham, NY (US)

( * ) Notice: Subject to any disclaimer, the term of this patent is extended or adjusted under 35 U.S.C. 154(b) by 779 days.

(21) Appl. No.: 11/303,471

(22) Filed: Dec. 16, 2005

(65) Prior Publication Data
US 2007/0141411 A1    Jun. 21, 2007

(51) Int. Cl.
*H01M 10/44* (2006.01)
*H01M 10/46* (2006.01)

(52) U.S. Cl. ............................ 320/101; 429/9; 320/134

(58) Field of Classification Search ................. 320/101, 320/134; 429/9
See application file for complete search history.

(56) References Cited

U.S. PATENT DOCUMENTS

| | | | |
|---|---|---|---|
| 5,075,813 A | 12/1991 | Takabayashi | |
| 5,532,572 A | 7/1996 | Okamura | 310/1 |
| 5,880,951 A * | 3/1999 | Inaba | 363/144 |
| 6,369,461 B1 * | 4/2002 | Jungreis et al. | 307/46 |
| 6,387,556 B1 | 5/2002 | Fuglevand | |
| 6,573,682 B1 * | 6/2003 | Pearson | 320/101 |
| 2002/0105302 A1 | 8/2002 | Parks et al. | |
| 2003/0210017 A1 * | 11/2003 | Tsujii et al. | 320/166 |
| 2004/0013920 A1 | 1/2004 | Hasuka | |
| 2004/0076860 A1 * | 4/2004 | Aso | 429/23 |
| 2004/0150926 A1 | 8/2004 | Wilk | |
| 2004/0202900 A1 * | 10/2004 | Pavio et al. | 429/9 |
| 2006/0057441 A1 | 3/2006 | Wills | |
| 2007/0141428 A1 | 6/2007 | Skidmore | |
| 2007/0141429 A1 | 6/2007 | Robertson | |

* cited by examiner

*Primary Examiner* — Edward Tso
*Assistant Examiner* — Samuel Berhanu
(74) *Attorney, Agent, or Firm* — Trop, Pruner & Hu, P.C.

(57) ABSTRACT

A fuel cell system includes a fuel cell stack, energy storage and a control subsystem. The energy storage supplements a power that is provided by the fuel cell stack. The energy storage is coupled to the fuel cell stack and has a voltage. The control system regulates a peak of the voltage based on a temperature of the energy storage.

11 Claims, 7 Drawing Sheets

MAXIMIZING ENERGY STORAGE LIFE IN A FUEL CELL SYSTEM USING ACTIVE TEMPERATURE COMPENSATION

BACKGROUND

The invention generally relates to maximizing energy storage life in a fuel cells system using active temperature compensation.

A fuel cell is an electrochemical device that converts chemical energy directly into electrical energy. For example, one type of fuel cell includes a proton exchange membrane (PEM), that permits only protons to pass between an anode and a cathode of the fuel cell. Typically PEM fuel cells employ sulfonic-acid-based ionomers, such as Nafion, and operate in the 60° Celsius (C) to 70° temperature range. Another type employs a phosphoric-acid-based polybenziamidazole, PBI, membrane that operates in the 150° to 200° temperature range. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

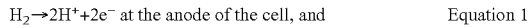

$$H_2 \rightarrow 2H^+ + 2e^- \text{ at the anode of the cell, and} \quad \text{Equation 1}$$

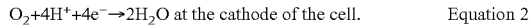

$$O_2 + 4H^+ + 4e^- \rightarrow 2H_2O \text{ at the cathode of the cell.} \quad \text{Equation 2}$$

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel cell stack is one out of many components of a typical fuel cell system, as the fuel cell system includes various other components and subsystems, such as a cooling subsystem, a cell voltage monitoring subsystem, a control subsystem, a power conditioning subsystem, etc. The particular design of each of these subsystems is a function of the application that the fuel cell system serves.

SUMMARY

In an embodiment of the invention, a fuel cell system includes a fuel cell stack, energy storage and a control subsystem. The energy storage supplements a power that is provided by the fuel cell stack. The energy storage is coupled to the fuel cell stack and has a voltage. The control system regulates a peak of the voltage based on a temperature of the energy storage.

In another embodiment of the invention, a technique includes communicating reactants to a fuel cell stack to produce power for a load. The technique includes coupling energy storage to the fuel cell stack to supplement power to the load during a time in which the stack does not provide sufficient power to the load. The energy storage has a voltage. The technique includes regulating a peak of the voltage based on a temperature of the energy storage.

Advantages and other features of the invention will become apparent from the following drawing, description and claims.

DETAILED DESCRIPTION

Figure 1:
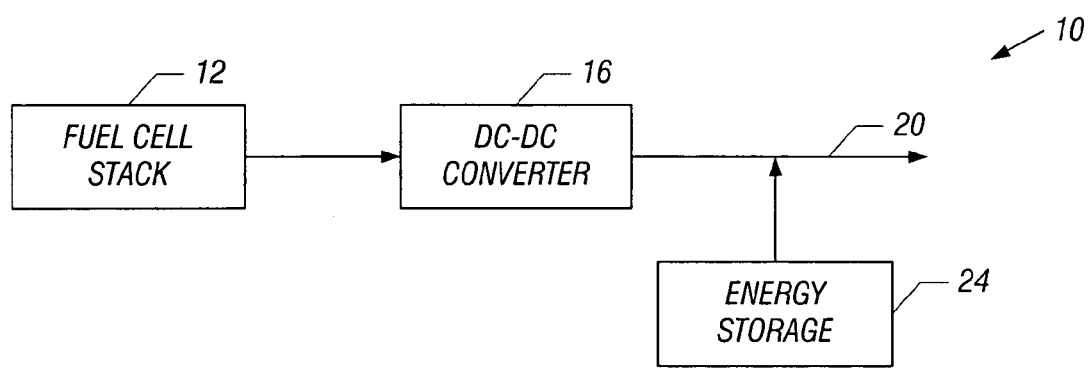
FIG. 1 is a schematic diagram of a fuel cell system.

Referring to FIG. 1, a fuel cell system 10 may include reserve energy storage 24 for purposes of supplementing power that is provided by a fuel cell stack 12 to a load (not depicted in FIG. 1) during a time (such as during power up or a sudden increase in the power that is demanded by the load) in which the stack 12 is unable to provide all of the power for the load. As shown in FIG. 1, the energy storage 24 may be coupled to an output terminal 20 of a DC-to-DC converter 16 of the fuel cell system 10. The fuel cell system 10 may also include power conditioning circuitry (not shown in FIG. 1) for purposes of converting power that is provided by the DC-to-DC converter 16 into the appropriate form for the load.

If the energy storage 24 is a capacitor (which represents one or more capacitors that are coupled together in parallel), a potential problem with connecting the energy storage 24 to the output terminal 20 of the DC-to-DC converter 16 is that a large capacitance is needed. The need for a large capacitance is due to the constraint that is placed on the capacitor's voltage variation by the DC-to-DC converter 16. More particularly, when the capacitor discharges to provide supplemental power, the energy that is discharged from the capacitor is proportional to the capacitance of the capacitor and to the range over which the capacitor's voltage varies during the discharge. Because the output voltage of the DC-to-DC converter 16 (and thus, the voltage of the capacitor) is tightly regulated, this means the capacitor is oversized to store a sufficient amount of reserve energy.

As a more specific example, if it is assumed that the voltage that appears on the output terminal 20 of the DC-to-DC converter 16 is 48 volts DC and the capacitor needs to store 5 kilowatts (kW) for thirty seconds, then the capacitance needs to be 326 Farads (F). This calculation assumes that the regulated output voltage of the DC-to-DC converter 16 allows for a ten percent variation, from 52.8 volts to 43.2 volts. If allowed to discharge over a larger voltage range of 52.8 volts to 0 volts, the capacitance required is 108F. Thus, most of the energy that is stored in the capacitor is not utilized because the capacitor is not permitted to totally discharge due to its constrained voltage range.

The input voltage range of the DC-to-DC converter 16 has a larger degree of variation than the converter's output voltage range. Therefore, in accordance with some embodiments of the invention, capacitive storage is coupled to the input terminal of the DC-to-DC converter instead of to its output terminal to take advantage of the wider voltage range, which permits a greater percentage of energy to be discharged from the capacitance. Thus, less capacitance is needed to store the same amount of reserve energy.

Figure 2:
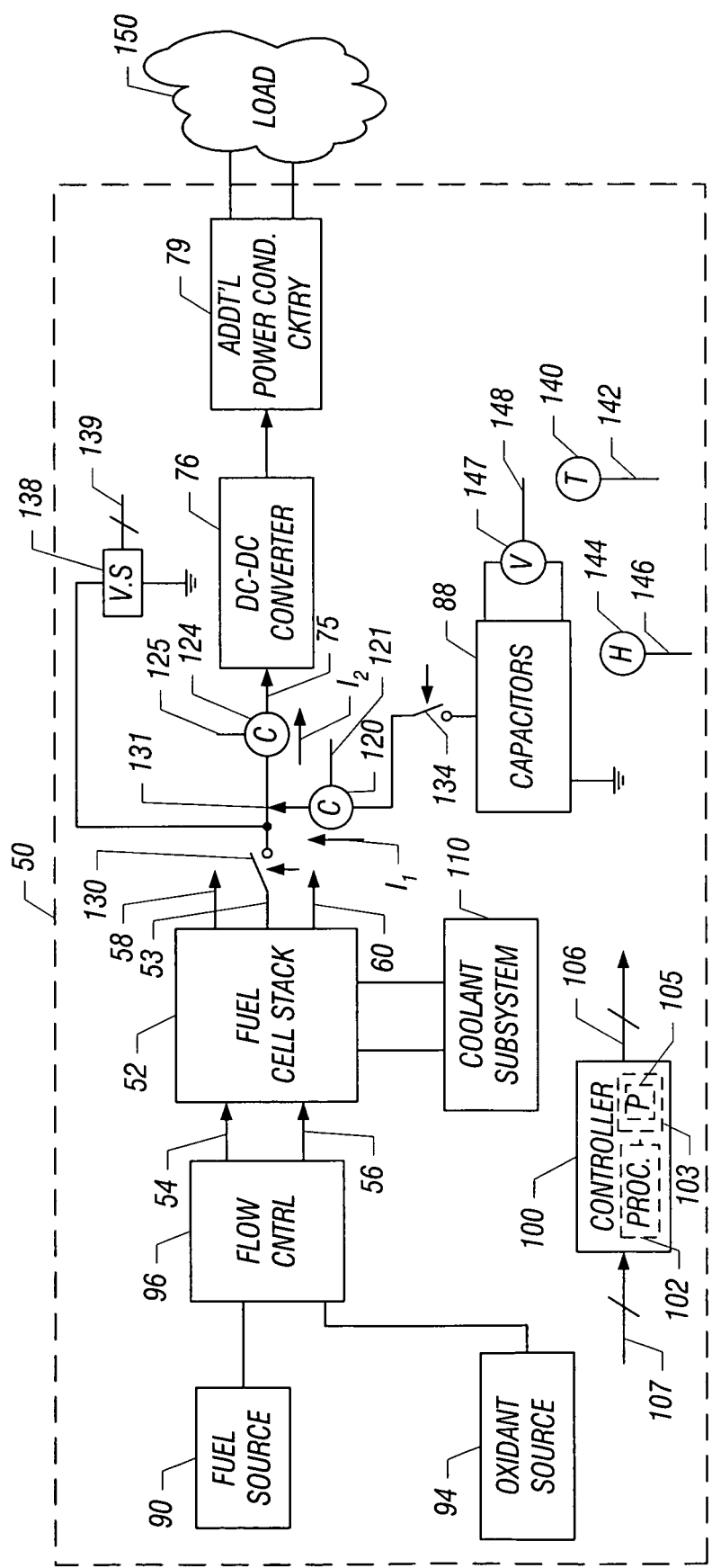
FIG. 2 is a schematic diagram of a fuel cell system according to an embodiment of the invention.

FIG. 2 depicts an exemplary fuel cell system 50 that includes reserve energy storage that is formed from a bank of capacitors 88 that are coupled together in series (although they could be in parallel or a combination of the two). As a unit, the bank of capacitors 88 is coupled in parallel with the fuel cell stack 52. More specifically, the bank of capacitors 88 is coupled to both an input terminal 75 of a DC-to-DC converter 76 and an output terminal 53 of a fuel cell stack 52 of the system 50. Due to this arrangement, the size of the capacitive storage is reduced (as compared to coupling the capacitors to an output terminal of the DC-to-DC converter 76, for example) due to the wider available discharge voltage range. The smaller capacitive storage, in turn, decreases costs, increases reliability and requires less packaging space. Furthermore, the commonality of a fuel cell system family with multiple output voltages is increased, and output voltage regulation may be improved.

As a more specific example, in accordance with some embodiments of the invention, the capacitors 88 may be ultracapacitors. Unlike a conventional capacitor that stores charge between two electrode plates that are separated by a dielectric medium, an ultracapacitor contains porous electrode plates that are suspended within an electrolyte. Unlike a conventional battery (which also contains an electrolyte), the porous electrode plates are non-reactive, which means the ultracapacitor can be charged and discharged a significantly larger number of times than a conventional battery over its lifetime. When a voltage is applied across the porous electrode plates of the ultracapacitor, the positive electrode plate attracts the negative ions in the electrolyte, and the negative electrode plate attracts the positive ions in the electrolyte.

Among the other features of the fuel cell system 50, the fuel cell stack 52 produces power on its output stack terminal 53 in response to fuel and oxidant flows that are received at an anode inlet 54 and oxidant inlet 56, respectively, of the stack 52. The DC-to-DC converter 76 converts the stack voltage (that appears on the output stack terminal 53) of the fuel cell stack 52 into a regulated DC output voltage that appears on the output terminal of the DC-to-DC converter 76. This regulated output voltage, in turn, may be further converted by additional power conditioning circuitry 79 into an appropriate voltage (i.e., an AC voltage or a DC voltage, depending on the application) for a load 150 of the fuel cell system 50.

During certain times (during a load transient or during the startup of the fuel cell system 50, as examples), the fuel cell stack 52 may momentarily be unable to provide all of the power that is demanded by the load 150. During these times, the capacitors 88 discharge to provide supplemental power to the load 150. Conversely, when the fuel cell stack 52 provides more power than is needed by the load 150, the excess power is used to charge the capacitors 88 (assuming the capacitors are not fully charged).

The fuel cell system 50 includes various other components and subsystems. For example, as depicted in FIG. 2, the incoming fuel flow to the fuel cell stack 52 may be provided by a fuel source 90 (a hydrogen tank or a reformer, as examples); and the oxidant flow may be provided by an oxidant source 94, such as an air blower, in accordance with some embodiments of the invention. The fuel and oxidant flows that are provided by the fuel 90 and oxidant 94 sources pass through flow control 96 (pressure regulators, control valves, etc.), to the anode 54 and oxidant 56, respectively, inlets of the fuel cell stack 52. Inside the fuel cell stack 52, the fuel flow is communicated through flow channels of the fuel cell stack 52 and exits the stack 52 at an anode outlet 58 of the stack 52. It is noted that in some embodiments of the invention, the anode exhaust flow from the fuel cell stack 52 may be communicated to a flare or oxidizer, and/or may be routed at least in part back to the anode inlet 54. Furthermore, in some embodiments of the invention, the anode chamber of the fuel cell stack 52 may be "dead-headed," or closed off so that no anode exhaust exits the stack 52. Thus, many variations are possible and are within the scope of the appended claims.

The incoming oxidant flow is communicated from the oxidant inlet 56 through the oxidant flow channels of the stack 52; and the oxidant flow exits the fuel cell stack at the oxidant outlet 60. Depending on the particular embodiment of the invention, the exhaust from the outlet 60 may be provided to a flare or oxidizer or may be recirculated back through the fuel cell stack 52. Thus, many variations are possible and are within the scope of the appended claims.

The fuel cell system 50 may also include a coolant subsystem 110 that represents various heat exchangers, radiators, etc., which circulate coolant through the fuel cell stack 52 for purposes of regulating the temperature at which the stack 52 operates. Furthermore, the coolant subsystem 110 may communicate heat from the fuel cell stack 52 for a thermal application (to heat water in a hot water heater, for example), depending on the particular embodiment of the invention.

As also depicted in FIG. 2, in accordance with some embodiments of the invention, the fuel cell system 50 may include a controller 100. The controller 100 may include one or more processors (microcontrollers and/or microprocessors, for example), such as the depicted processor 102, that is coupled to a memory 103. The memory 103 may store, for example, program instructions 105 that are executed by the processor 102 for purposes of causing the controller 100 to control various aspects of the fuel cell system 50, as further described below. The controller 100 also includes various input terminals 107 for purposes of receiving various sensor signals, status signals, commands, etc., from components of the fuel cell system 50.

In response to the signals that are received at the input terminals 107, the controller 100 produces various communication and control signals at output terminals 106 of the controller 100. The output terminals 106 may, for example, communicate signals that control various switches, motors, valves, etc., of the fuel cell system 50, depending on the particular embodiment of the invention. As a more specific example, in accordance with some embodiments of the invention, the input terminals 107 may receive signals from various sensors, such as a hydrogen sensor 144, a temperature sensor 140, a voltage sensor 147, a current sensor 120, a current sensor 125 and a voltage sensor 138. These sensors are described in connection with their specific functions below. The controller 100 may use the output signals that are provided at the output terminals 106 to control switches 130 and 134, which are also further described below.

A potential concern with coupling the capacitors 88 to the output terminal 53 of the fuel cell stack 52 is that the capacitors 88 are capable of backfeeding current (i.e., communicating current into instead of out of the output terminal 53) to the fuel cell stack 52 and damaging the stack 52 as a result. One way to avoid the backfeeding of current is to couple a diode between the stack output terminal 53 and the capacitors 88. However, disadvantages of using a diode may include a less efficient design (due to the diode voltage drop), the addition of extra hardware and additional thermal management complexities that are associated with the use of a diode.

Therefore, in accordance with some embodiments of the invention, the controller 100 controls the switch 130 (depicted as being closed in FIG. 2) for purposes of controlling the connection between the capacitors 88 and the fuel cell stack 52 so that a current path does not exist between the fuel cell stack 52 and the capacitors 88 when a potential exists for backward current flow. In some embodiments of the invention, the switch 130 is connected between the stack output terminal 53 and a DC bus that includes a node 131; and the capacitors 88 are connected in parallel between the node 131 and ground. As depicted in FIG. 2, the input terminal 75 of the DC-to-DC converter 76 is coupled to the node 131. Thus, due to this arrangement, when the switch 130 is closed, the fuel cell stack 52 is connected to the capacitors 88; and when the switch 130 is opened, the capacitors 88 are isolated from the fuel cell stack 52.

Three current paths are established due to the connections among the fuel cell stack 52, the DC-to-DC converter 76 and the capacitors 88: a first current path from the fuel cell stack terminal 53 to the node 131; a second current path from the node 131 to the input terminal 75 of the DC-to-DC converter 76; and a third current path between the node 131 and the capacitors 88. In some embodiments of the invention, the controller 100 monitors the currents in two of these current paths to determine when there is a potential for backwards current flow from the capacitors 88 to the fuel cell stack 52. For example, if the current that is discharging from the capacitors 88 is approaching the level of the current that is going into the DC-to-DC converter 76, then the stack current is small enough to establish a significant threat of a reverse current. Upon detecting this condition, the controller 100 opens the switch 130 to prevent backflow of current into the stack 52 and allow the capacitors 88 to solely furnish power to the load 150.

As a more specific example, in accordance with some embodiments of the invention, the controller 100 monitors a current (called "$I_1$") between the capacitors 88 and the node 131 and monitors a current (called "$I_2$") that flows into the DC-to-DC converter 76 through the input terminal 75. By monitoring the $I_1$ and $I_2$ currents, the controller 100 is able to ascertain the potential for backwards current flow into the fuel cell stack 52 and operate the switch 130 accordingly. In this regard, in accordance with some embodiments of the invention, a current sensor 120 is located between the capacitors 88 and the node 131 to measure the $I_1$ current; and a current sensor 124 is located between the node 131 and the input terminal 75 to the DC-to-DC converter 76 for purposes of monitoring the $I_2$ current. The current sensor 120 may include, for example, an output terminal 121 that provides an indication of the $I_1$ current to the controller 100, and the current sensor 124 may include an output terminal 125 to provide an indication of the $I_2$ current to the controller 100.

Figure 3:
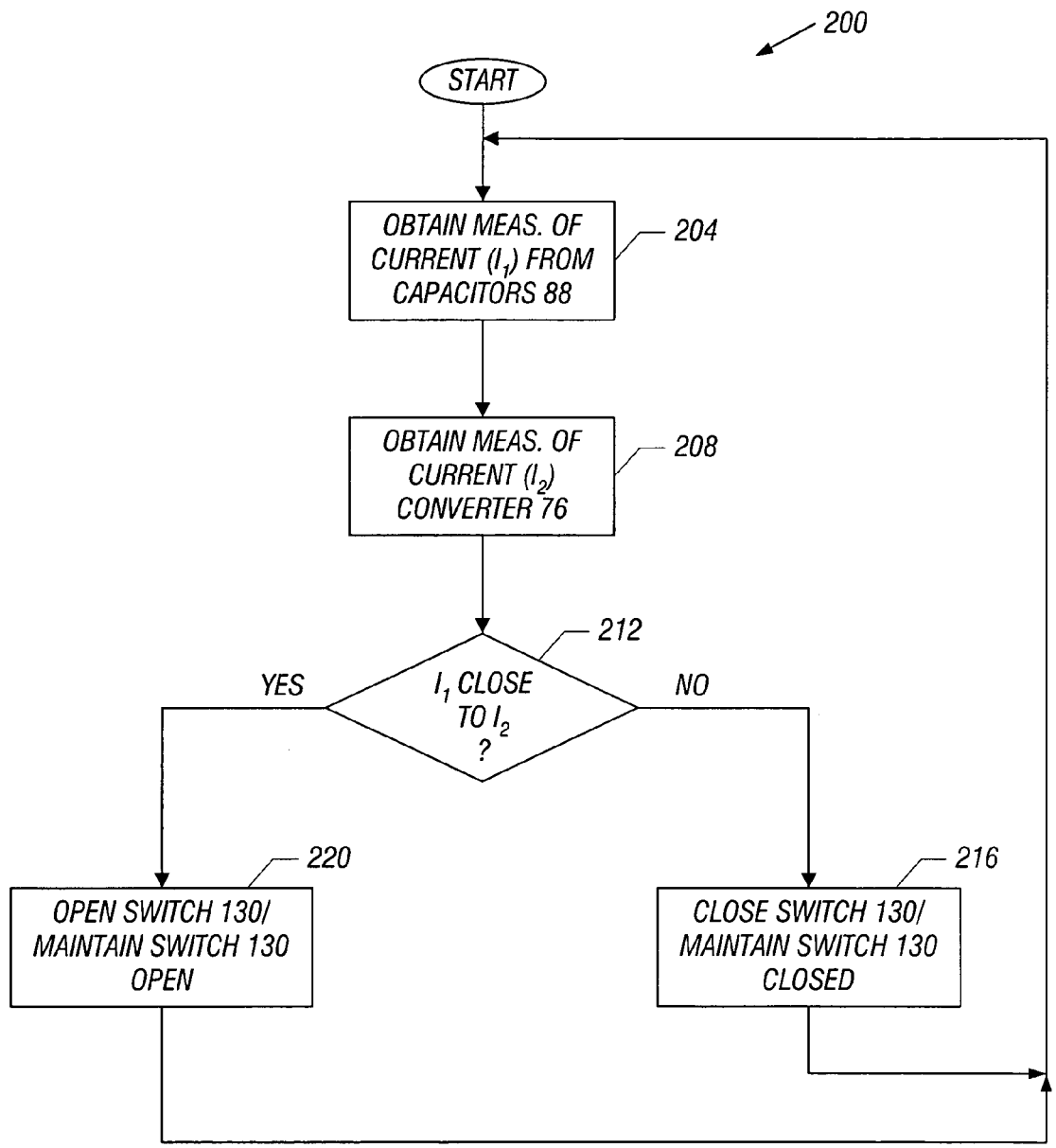
FIG. 3 is a flow diagram depicting a technique to prevent a backflow current from flowing from energy storage into a fuel cell stack according to an embodiment of the invention.

Referring to FIG. 3 in conjunction with FIG. 2, to summarize, in accordance with some embodiments of the invention, the controller 100 may use a technique 200 to prevent current from flowing into the fuel cell stack 52 through the stack output terminal 53. Pursuant to the technique 200, the controller 100 obtains (block 204) a measurement of the $I_1$ current flowing from the capacitors 88 and also obtains (block 208) a measurement of the $I_2$ current into the DC-to-DC converter 76.

Based on the measurements of the $I_1$ and $I_2$ currents, the controller 100 determines (diamond 212) whether the $I_1$ current is close in magnitude to the $I_2$ current. If not, then the controller 100 closes the switch 130 or maintains the switch 130 closed (depending on the current state of the switch 130), as depicted in block 216. If, however, the $I_1$ is close in magnitude to the $I_2$ current, then the controller 100 opens the switch 130 or maintains the switch 130 open, depending on the current state of the switch 130 as depicted in block 220.

Referring back to FIG. 2, it is noted that the use of the current sensors 120 and 124 sets forth one out of many possible embodiments of the invention, as the controller 100 may use other techniques to assess the potential for backflow current into the fuel cell stack 52. Thus, the overall technique that is described herein may be performed using current sensors in any of the two current paths that are established by the fuel cell stack 52, the capacitors 88 and the DC-to-DC converter 76.

Additionally, in accordance with some embodiments of the invention, the controller 100 may determine the current in one of the current paths using an indirect or implied current measurement. For example, in accordance with some embodiments of the invention, the controller 100 may determine the $I_1$ current by multiplying the system output current by an efficiency factor. As yet another example, in accordance with some embodiments of the invention, the controller 100 may measure the stack current directly via a current sensor (not shown) that is in series with the switch 130; and when the stack current is negative or close to zero (as examples), the controller 100 may then open the switch 130. Thus, many variations are possible and are within the scope of the appended claims.

Most if not all of the components of the fuel cell system 50 may be incorporated into an internal cabinet. The temperature inside the cabinet may, if not for the measures that are described below, decrease the life of the capacitors 88, especially for the case in which the capacitors 88 are ultracapacitors. In this regard, charging the capacitors 88 to their peak operating voltages may reduce the life of the capacitors 88 for higher cabinet temperatures. More specifically, in the case of ultracapacitors, the lifetime of an ultracapacitor may be cut in half for every ten degrees Celsius increase in temperature above 25° C.

In accordance with some embodiments of the invention, for purposes of maximizing the lifetimes of the capacitors 88, the capacitor voltage is decreased with temperature. More specifically, in accordance with some embodiments of the invention, the peak operating voltage, or the voltage to which each capacitor 88 is charged, is varied according to the capacitor temperature. In the case of ultracapacitors, decreasing the voltage by 100 millivolts (mV) for every ten degree Celsius increase in temperature above 25° C. offsets the detrimental effects due to temperature. For example, an ultracapacitor with a life of 1.0 at 25° C. and a peak operating voltage of 2.5 V has a life of 0.5 at 35° C. and a peak operating voltage of 2.5V. However, if the peak operating voltage is decreased to 2.4V at 35° C., the life remains at 1.0.

In accordance with some embodiments of the invention, the capacitor peak operating voltage is regulated beginning at a certain minimum temperature threshold. For example, in accordance with some embodiments of the invention, in the case where the capacitors 88 are ultracapacitors, the peak operating voltage is actively decreased after the temperature rises above 25° C. The control of the peak operating voltage may be accomplished using dedicated logic or using the controller 100 under the control of firmware (as examples), depending on the particular embodiment of the invention. As the peak operating voltage decreases, there is a tradeoff between available capacity and lifetime of the capacitors. In many applications, the increase in lifetime greatly offsets the decrease in capacity.

As a more specific example, in accordance with some embodiments of the invention, a temperature sensor 140 (FIG. 2) that may be located inside the system cabinet to provide an indication (via a signal at its output terminal 142) of the temperature of the capacitors 88. The controller 100 can therefore monitor the capacitor temperature for purposes of regulating the peak operating voltage of the capacitors 88. The controller 100 monitors the voltage of the capacitors 88 via a signal that is provided at an output terminal 148 of a voltage sensor 147.

To regulate the peak operating voltage, the fuel cell system 50 uses the switch 134 (in some embodiments of the invention) that is coupled between the node 131 and the capacitors 88. When the switch 134 is closed, the capacitors 88 are allowed to charge and during this charging, the voltage of the capacitors 88 increases. However, when the capacitor voltage reaches the targeted peak operating voltage, the controller 100 opens the switch 134 to stop charging of the capacitors 88 and thus, establish the peak operating voltage.

Figure 4:
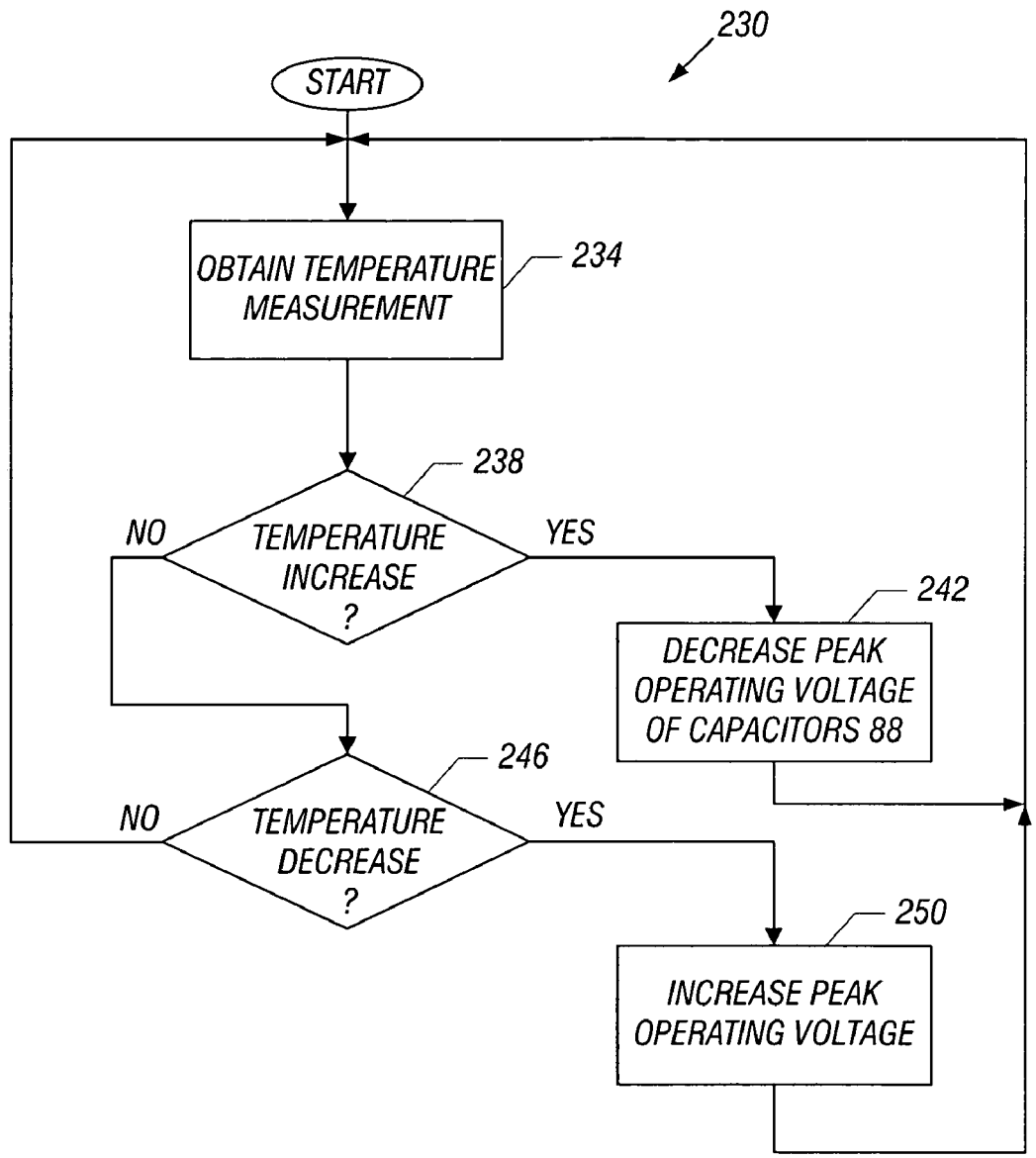
FIG. 4 is a flow diagram depicting a technique to maximize the energy storage life of a capacitor using active temperature compensation according to an embodiment of the invention.

Referring to FIG. 4 in conjunction with FIG. 2, thus, in accordance with some embodiments of the invention, the controller 100 may use a technique 230 for purposes of regulating the peak operating voltage. Pursuant to the technique 230, the controller 200 obtains a temperature measurement, as depicted in block 234. Thus, the controller 100 may monitor the temperature via the temperature sensor 140. If the controller 100 determines (diamond 238) that the temperature has increased, then the controller 100 decreases (block 242) the peak operating voltage of the capacitors 88. Otherwise, if the controller 100 determines (diamond 246) that a decrease has occurred, then the controller increases (block 250) the peak operating voltage. It is noted that the technique 230 assumes that a minimum temperature threshold (25° C., for example) has been surpassed so that the controller 100 is actively regulating the peak operating temperature. Thus, in accordance with some embodiments of the invention, below the peak operating temperature (25° C., for example), the controller 100 may leave the peak operating voltage at a default value.

Figure 5:
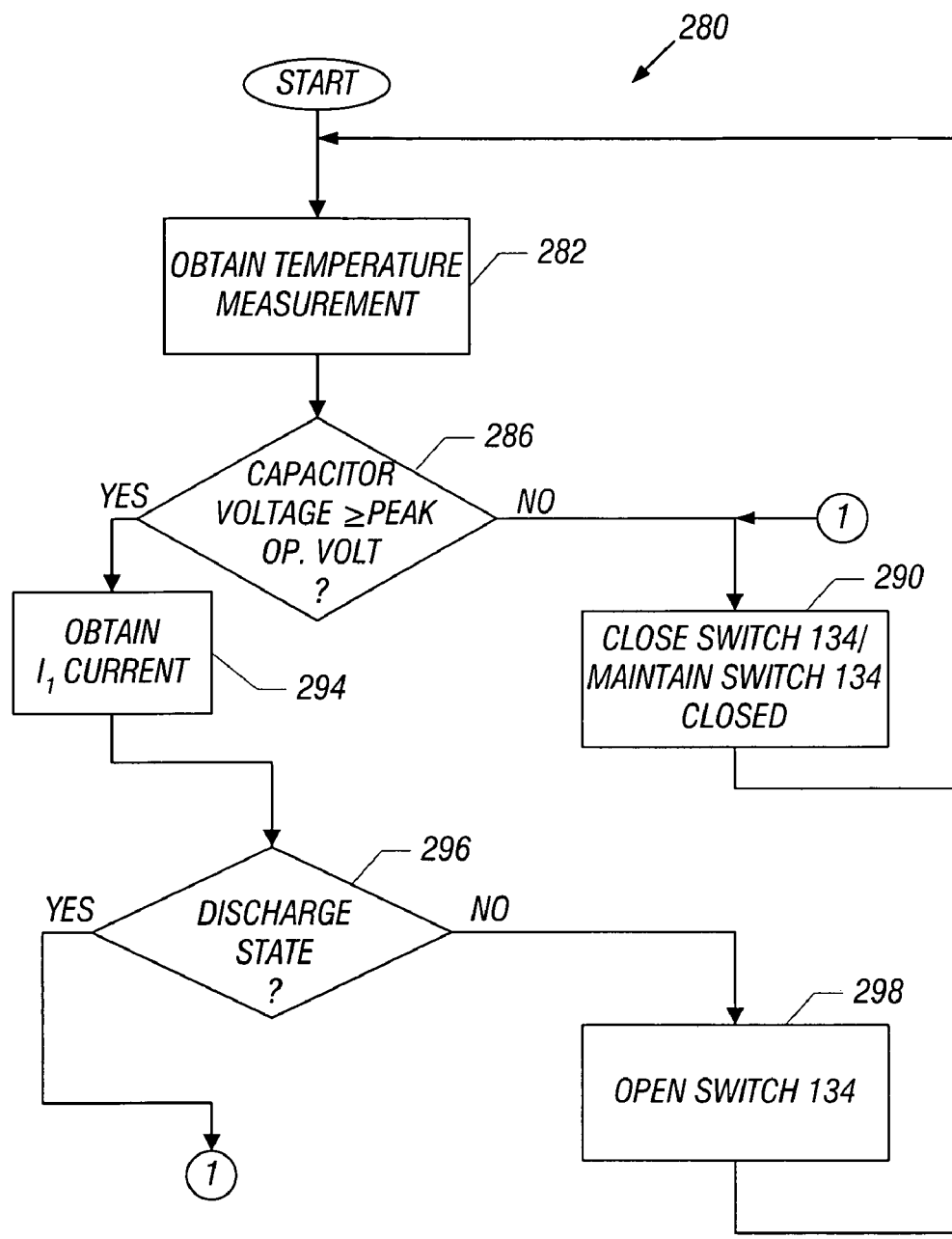
FIG. 5 is a flow diagram depicting a technique to regulate a peak capacitor voltage according to an embodiment of the invention.

Referring to FIG. 5 in conjunction with FIG. 2, in accordance with some embodiments of the invention, the controller 100, or possibly other logic, may regulate the peak operating voltage by controlling the switch 134 pursuant to a technique 280. In the technique 280, the controller 100 obtains (block 282) the voltage of the capacitors 88. Thus, in accordance with some embodiments of the invention, the controller 100 may obtain a signal from the output terminal 148 of the voltage sensor 147 that measures the capacitor voltage.

If the controller 100 determines (diamond 286) that the capacitor voltage is less than the established peak operating voltage, then the controller 100 closes (block 290) the switch 134 or maintains the switch 134 closed, depending on the current state of the switch 134. If, however, the controller 100 determines (diamond 286) that the capacitor voltage is greater than or equal to the peak operating voltage, then the controller 100 obtains (block 294) an indication of the $I_1$ current. For example, the controller 100 may use the current sensor 120 for this determination. If from the $I_1$ current the controller 100 determines (diamond 296) that the capacitors 88 are in a discharge state, then the controller 100 closes the switch 134 or maintains the switch 134 closed, depending on the current state of the switch 134, pursuant to block 290. If, however, the capacitors 88 are not discharging, then the controller 100 opens the switch 134, pursuant to block 298, to prevent further charging of the capacitors 88 and thus, prevent raising the voltage of the capacitors 88.

Other techniques and components may be used to regulate the peak operating voltage of the capacitors 88 based on temperature in accordance with other embodiments of the invention. Additionally, the temperature compensation scheme may be used regardless of whether the fuel cell stack 52 is connected to or disconnected from the DC bus by the switch 130, as in some embodiments of the invention, the temperature compensation is performed when the fuel cell stack 50 is disconnected from the DC bus. More specifically, in accordance with some embodiments of the invention, to charge the capacitors 88, the fuel cell stack 52 may be disconnected from the power bus, and the capacitors 88 may be charged by backfeeding through the DC-to-DC converter 76. This is because that in some embodiments of the invention, the load 150 may be a DC bus that is capable of furnishing power back to the fuel cell system 10 for purposes of charging the capacitors 88.

A typical ultracapacitor may contain a gas, such as acetronitrile (also called "methyl cyanide"), which is hazardous to humans and may be released if the ultracapacitor ruptures. Thus, a technician who services a fuel cell system may be exposed to the gas if no advance warning is given that an ultracapacitor of the fuel cell system 50 has ruptured and is leaking the gas.

Referring to FIG. 2, in accordance with some embodiments of the invention, a technique is used to detect an ultracapacitor rupture so that a service technician is forewarned about the rupture. The technique includes using an existing flammable hydrogen gas sensor 144 of the fuel cell system 50 to detect the presence of a gas that is released upon rupture of an ultracapacitor. This allows the benefit of detecting a leak without personnel being present; and provides the ability to detect leaks in real-time so that corrective action and/or the communication of warnings may occur automatically.

As a more specific example, in accordance with some embodiments of the invention, the flammable hydrogen gas sensor 144 may be a metal-oxide-semiconductor (MOS) hydrogen sensor, such as (as examples) the Powe℮rknowz hydrogen gas sensor that is available from Neodym Technology, Inc. of Vancouver, British Columbia Canada or the combustible hydrogen gas sensor that is available from Figaro Engineering Inc. of Mino, Osaka Japan. Other sensors may be used in accordance with other embodiments of the invention.

In some embodiments of the invention, in addition to detecting combustible hydrogen gas in the fuel cell system 50, the flammable hydrogen gas sensor 144 also is capable of detecting the presence of a gas, such as acetonitrile, which may leak from an ultracapacitor. The ability of the hydrogen gas sensor 144 to detect both hydrogen and acetonitrile is due to the chemical similarities of hydrogen and acetonitrile. Thus, the flammable gas hydrogen sensor 144 may be used for purposes of monitoring the fuel cell system 50 for a potential flammable hydrogen gas level in the system 50, as well as detecting a rupture in one of the capacitors 88.

Figure 6:
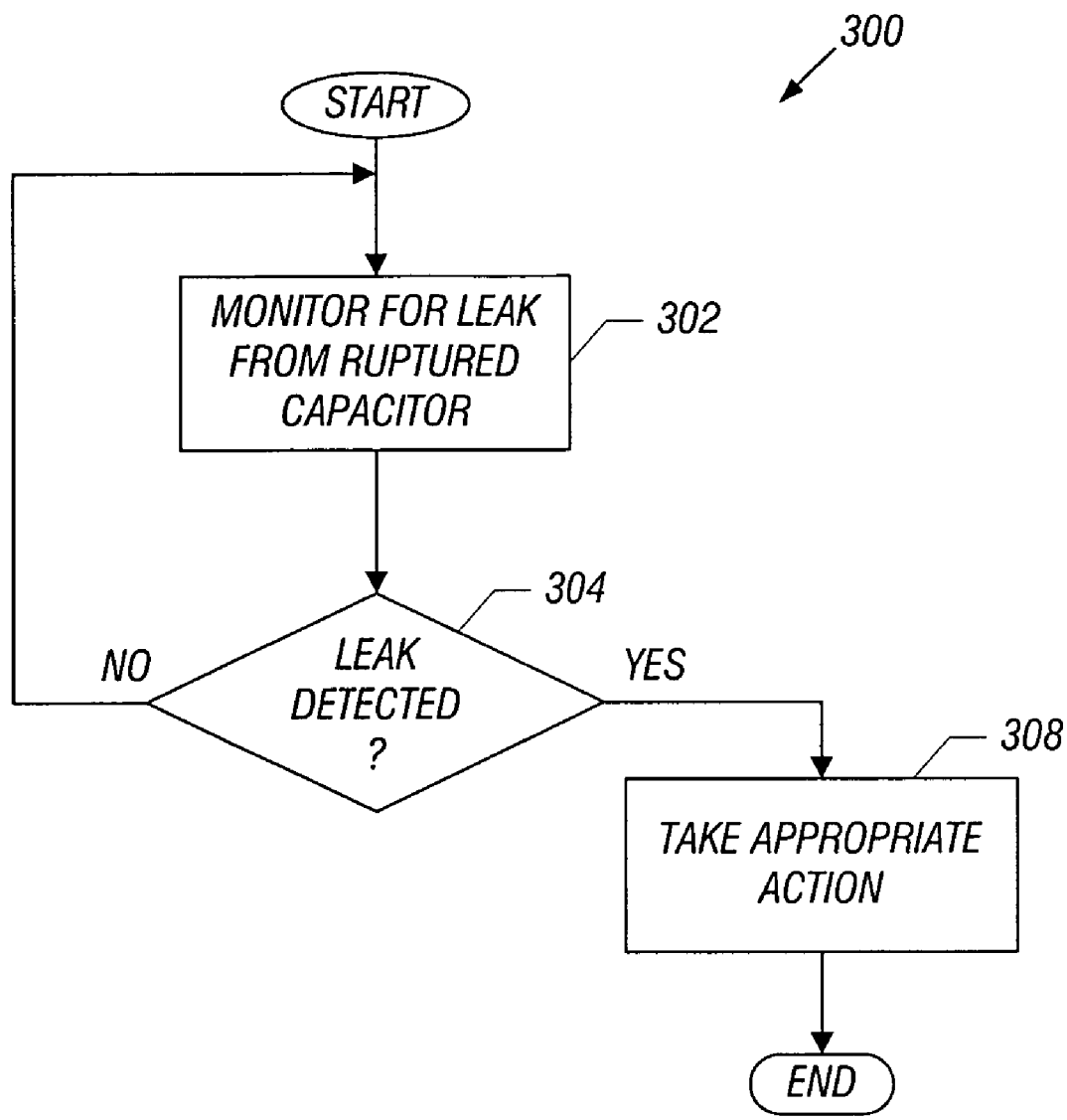
FIGS. 6 and 7 are flow diagrams depicting techniques to detect a ruptured capacitor according to embodiments of the invention.

Referring to FIG. 6 in conjunction with FIG. 2, therefore, pursuant to some embodiments of the invention, a technique 300 includes monitoring (block 302) for a leak from a ruptured capacitor and in the determination (diamond 304) that a rupture has occurred, an appropriate action is taken, pursuant to block 308. This appropriate action may include, as examples, communicating a warning for service personnel, alerting the personnel to presence of the gas from the ruptured capacitor; shutting down all or part of the fuel cell system 50; communicating a warning message to an external network; etc.

Figure 7:
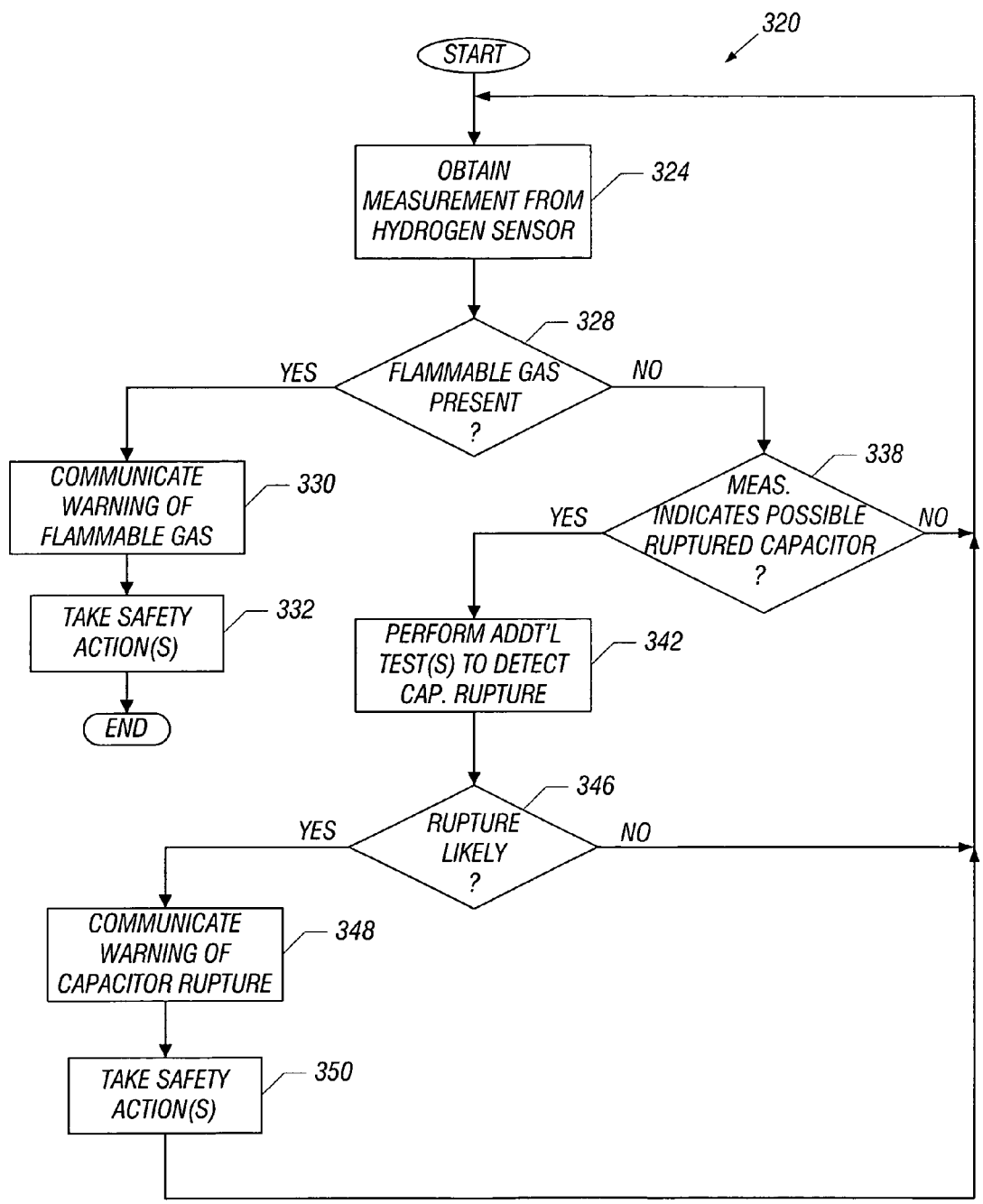

FIG. 7 depicts a more specific technique 320 that may be used when the same sensor (such as the flammable hydrogen gas sensor 144) is used to detect both flammable gas leaks and the rupture of a capacitor in the fuel cell system 50. Pursuant to the technique 320, hydrogen measurements are obtained from the sensor 144, pursuant to block 324. Thus, the controller 100 may, for example, monitor a signal provided at an output terminal 146 of the sensor 144 for purposes of monitoring the levels of the analog signal. As a more specific example, in accordance with some embodiments of the invention, the fuel cell system 50 may include one or more comparators that compare the analog signal that is provided by the output terminal 146 to different threshold levels. A lower level of the signal may be used to indicate rupture of an ultracapacitor, and a higher threshold level may be used to indicate the presence of flammable gas.

Thus, pursuant to the technique 320, the controller 100 monitors the output signal that is provided by the flammable hydrogen gas sensor 144 to determine (diamond 328) whether flammable gas is present. In this regard, if the signal that is furnished by the sensor 144 is at the higher threshold level, then the controller 100 concludes that a flammable gas is present, communicates (block 330) a warning of flammable gas and then takes (block 332) the appropriate safety actions. These actions may include shutting down part or all of the fuel cell system 50, in accordance with some embodiments of the invention.

If the analog signal that is provided by the flammable gas hydrogen sensor 144 has a lower level below the upper threshold but above the lower threshold, then an ultracapacitor may have ruptured. Therefore, in response to determining (diamond 338) that the measurement from the flammable gas hydrogen sensor 144 indicates a possible ruptured capacitor, the controller 100 performs one or more additional tests (as depicted in block 342) to detect a capacitor rupture. These corroborating tests may include, for example, a test of the electrostatic resistance (ESR) of the capacitors 88 as well as a test of the capacitance of the capacitors 88. The tests may be conducted using the voltage sensor 147 and the current sensor 120, for example. The output from the hydrogen sensor 144 in conjunction with one or more additional tests may be used to confirm the rupture of a capacitor. If the controller 100 then determines (diamond 346) that a rupture is likely, then the controller 100 communicates (block 348) a warning of the capacitor rupture and takes the appropriate safety action(s), as depicted in block 350.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell system comprising:
    a fuel cell stack;
    energy storage comprising at least one capacitor to supplement a power provided by the fuel cell stack, said at least one capacitor being coupled to the fuel cell stack and having a voltage;
    a switch, the switch being part of a current path coupled to the energy storage when closed; and
    a control subsystem to regulate a peak of the voltage based on a temperature of said at least one capacitor to cause the peak at which the control subsystem regulates the voltage to decrease with increasing temperature, wherein
    the control subsystem is adapted to:
        determine a threshold based on the temperature,
        open the switch when the voltage exceeds the threshold and the energy storage is not discharging, and maintain the switch closed while said at least one capacitor is supplementing the power provided by the fuel cell stack regardless of whether the voltage exceeds the threshold.

2. The fuel cell system of claim 1, further comprising:
    a sensor to provide a signal indicative of the temperature.

3. The fuel cell system of claim 1, wherein the energy storage is coupled to an output terminal of the fuel cell stack and an input terminal of a power conditioning circuit.

4. The fuel cell system of claim 3, wherein the power conditioning circuitry comprises a DC-to-DC converter and the input terminal comprises an input terminal of the DC-to-DC converter.

5. The fuel cell system of claim 1, wherein said at least one capacitor comprises at least one ultracapacitor.

6. The fuel cell system of claim 1, wherein the controller comprises at least one of logic and a processor.

7. A method comprising:
    communicating reactants to a fuel cell stack to produce power for a load;
    coupling energy storage comprising at least one capacitor to the fuel cell stack to supplement power to the load during a time in which the stack does not provide sufficient power to the load, said at least one capacitor having a voltage, the coupling comprising closing a switch; and
    regulating a peak of the voltage based on a temperature of said at least one capacitor to cause the peak at which the control subsystem regulates the voltage to decrease with increasing temperature, the regulating comprising opening the switch when the voltage exceeds the threshold and is not discharging, and maintaining the switch closed in response to said at least one capacitor supplementing the power provided by the fuel cell stack regardless of whether the voltage exceeds the threshold.

8. The method of claim 7, further comprising:
    measuring the temperature of said at least one capacitor.

9. The method of claim 7, further comprising:
    coupling the energy storage to an output terminal of the fuel cell stack and an input terminal of a power conditioning circuit.

10. The method of claim 9, wherein power conditioning circuitry comprises a DC-to-DC converter and the input terminal comprises an input terminal of the DC-to-DC converter.

11. The method of claim 7, wherein the act of coupling comprises coupling at least one ultracapacitor to the fuel cell stack.

* * * * *